US011654788B2

(12) United States Patent
Duensbier

(10) Patent No.: US 11,654,788 B2
(45) Date of Patent: May 23, 2023

(54) METHOD FOR OPERATING A CHARGING STATION, FOR A MOTOR VEHICLE, AND CORRESPONDING CHARGING STATION

(71) Applicant: AUDI AG, Ingolstadt (DE)

(72) Inventor: Stefan Duensbier, Regensburg (DE)

(73) Assignee: AUDI AG, Ingolstadt (DE)

( * ) Notice: Subject to any disclaimer, the term of this patent is extended or adjusted under 35 U.S.C. 154(b) by 224 days.

(21) Appl. No.: 16/764,509

(22) PCT Filed: Sep. 25, 2018

(86) PCT No.: PCT/EP2018/075889
§ 371 (c)(1),
(2) Date: May 15, 2020

(87) PCT Pub. No.: WO2019/096474
PCT Pub. Date: May 23, 2019

(65) Prior Publication Data
US 2020/0384877 A1 Dec. 10, 2020

(30) Foreign Application Priority Data
Nov. 20, 2017 (DE) ...................... 10 2017 220 693.4

(51) Int. Cl.
*B60L 53/66* (2019.01)
*B60L 53/68* (2019.01)
(Continued)

(52) U.S. Cl.
CPC ............... *B60L 53/66* (2019.02); *B60L 53/65* (2019.02); *B60L 53/68* (2019.02); *G07B 15/02* (2013.01);
(Continued)

(58) Field of Classification Search
CPC .......... B60L 53/66; B60L 53/65; B60L 53/68; B60L 2240/70; B60L 53/60; G07B 15/02;
(Continued)

(56) References Cited

U.S. PATENT DOCUMENTS

| 2009/0174365 A1 | 7/2009 | Lowenthal et al. |
| 2011/0131083 A1* | 6/2011 | Redmann ................ B60L 53/18 |
| | | 705/13 |

(Continued)

FOREIGN PATENT DOCUMENTS

| CN | 102930743 A | 2/2013 |
| CN | 205486856 U | 8/2016 |

(Continued)

OTHER PUBLICATIONS

International Search Report and Written Opinion of the International Searching Authority dated Dec. 12, 2018 in corresponding International application No. PCT/EP2018/075889; 26 pages including Machine-generated English-language translation.

(Continued)

*Primary Examiner* — Nha T Nguyen
(74) *Attorney, Agent, or Firm* — Maier & Maier, PLLC

(57) ABSTRACT

The disclosure relates to a method for operating a charging station for a motor vehicle having an electric energy store, including an energy supply device for supplying electric energy for charging the energy store and including a parking area for parking the motor vehicle during the charging process. It is provided that the availability status of the parking area is monitored by a device monitoring the surroundings which operates independently of the energy supply device and is transmitted to a control center via a communication connection. The disclosure furthermore relates to a charging station for a motor vehicle having an electric energy store.

13 Claims, 1 Drawing Sheet

(51) Int. Cl.
  *B60L 53/65*    (2019.01)
  *G07B 15/02*    (2011.01)
  *G08G 1/017*    (2006.01)
  *G08G 1/14*     (2006.01)

(52) U.S. Cl.
  CPC .......... *G08G 1/0175* (2013.01); *G08G 1/146* (2013.01); *B60L 2240/70* (2013.01)

(58) Field of Classification Search
  CPC ...... G08G 1/0175; G08G 1/146; Y02T 10/70; Y02T 10/7072; Y02T 10/72; Y02T 90/12; Y02T 90/14; Y02T 90/16
  See application file for complete search history.

(56) References Cited

U.S. PATENT DOCUMENTS

| | | | | |
|---|---|---|---|---|
| 2011/0208953 | A1* | 8/2011 | Solomon | B60L 53/305 713/400 |
| 2011/0227533 | A1* | 9/2011 | Wolfien | G07F 17/24 320/109 |
| 2012/0236149 | A1* | 9/2012 | Nagy | B60L 53/35 348/148 |
| 2014/0167985 | A1* | 6/2014 | Halnais | B60L 53/14 340/901 |
| 2015/0202975 | A1* | 7/2015 | Solomon | H02J 13/0003 705/7.26 |
| 2016/0189324 | A1* | 6/2016 | Eramian | H04W 4/40 705/13 |
| 2016/0358472 | A1* | 12/2016 | Bezak | G06Q 20/3224 |
| 2017/0024552 | A1* | 1/2017 | Rodine | B60L 53/66 |
| 2017/0253131 | A1 | 9/2017 | Kilic et al. | |
| 2017/0274789 | A1* | 9/2017 | Ma | B60L 53/36 |
| 2017/0372529 | A1* | 12/2017 | Gopalakrishnan | G07B 15/02 |
| 2018/0059242 | A1* | 3/2018 | Slindee | G01S 5/186 |
| 2018/0290553 | A1* | 10/2018 | Malik | B60L 53/52 |
| 2022/0148426 | A1* | 5/2022 | Longardner | G08G 1/04 |
| 2022/0171839 | A1* | 6/2022 | Eidam | A61B 5/6801 |

FOREIGN PATENT DOCUMENTS

| | | |
|---|---|---|
| CN | 106204930 A | 12/2016 |
| CN | 107154153 A | 9/2017 |
| CN | 107276157 A | 10/2017 |
| DE | 10 2010 012 366 A1 | 9/2011 |
| DE | 10 2011 007 690 A1 | 3/2012 |
| DE | 10 2011 007 697 A1 | 3/2012 |
| DE | 10 2012 204 850 A1 | 10/2013 |
| DE | 10 2014 225 122 A1 | 6/2016 |
| DE | 10 2015 200 018 A1 | 7/2016 |
| EP | 2426007 A2 | 3/2012 |
| JP | 2012033065 A | 2/2012 |

OTHER PUBLICATIONS

Search Report dated Dec. 13, 2021, in connection with corresponding German Application No. 102017220693.4 (11 pp., including machine-generated English translation).

Office Action dated Sep. 2, 2022, in connection with corresponding Chinese Application No. 201880074814.6 (20 pp).

Office Action dated Feb. 5, 2023, in corresponding Chinese Application No. 201880074814.6, 18 pages.

* cited by examiner

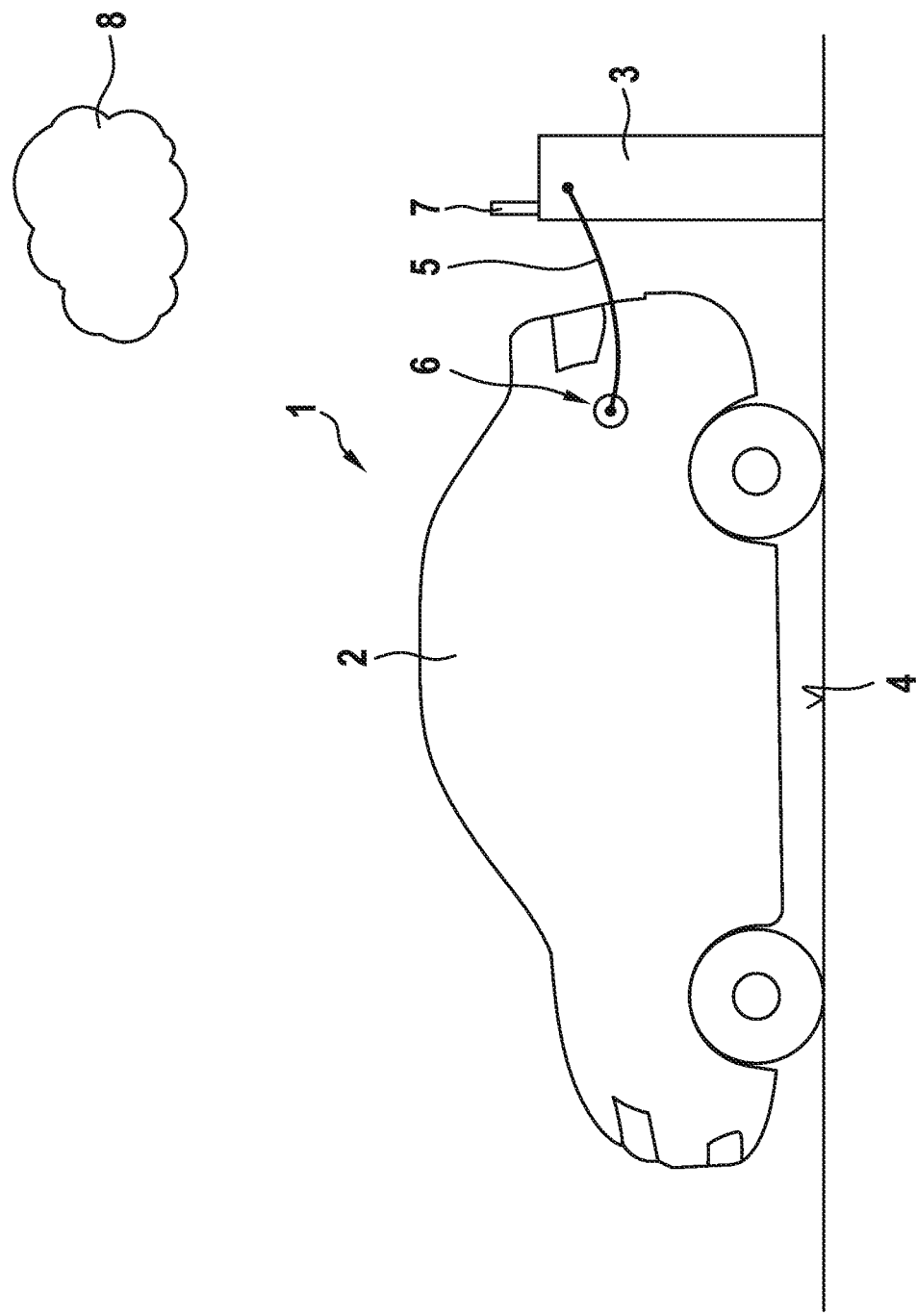

METHOD FOR OPERATING A CHARGING STATION, FOR A MOTOR VEHICLE, AND CORRESPONDING CHARGING STATION

FIELD

The disclosure relates to a method for operating a charging station for a motor vehicle having an electric energy store, comprising an energy supply device for supplying electric energy for charging the energy store and comprising a parking area for parking the motor vehicle during the charging process. The disclosure furthermore relates to a charging station for a motor vehicle having an electric energy store.

BACKGROUND

From the background art there is known for example the publication DE 10 2011 007 690 A1. This relates to a method for supplying electric energy to an energy store of an electrically operated vehicle by means of a stationary charging station providing electric energy, wherein a user of the charging station sends a user identification containing an initialization message and identifying the user and a charging station identification identifying the charging station to a service unit of an operator of the charging station; after the identification of the user and the charging station by the service unit, a confirmation signal confirming the successful initialization is sent from the service unit to the charging station to enable the charging station, the user mechanically and/or electrically connects the charging station and the energy store of the vehicle by a charging cable, after the connecting of the vehicle and the charging station and after the receiving of the confirmation signal by the charging station a start signal identifying the start of the charging process is sent from the charging station to the service unit and an electrical charging voltage is applied to carry out the charging process and the energy store is charged with the charging current, and the user is charged a fee for the charging process, wherein the user sends a charging fee message to the service unit specifying the maximum fee limit in order to determine a maximum amount of the charging fee and the charging process is interrupted and/or terminated once the maximum limit of the charging fee is reached and/or surpassed.

SUMMARY

The problem which the invention proposes to solve is to propose a method for operating a charging station having benefits as compared to known methods, in particular, ensuring a high availability of the charging stations for the motor vehicle or multiple motor vehicles.

It is provided that the availability status of the parking area is monitored by means of a device monitoring the surroundings which operates independently of the energy supply device and is transmitted to a control center via a communication connection.

The charging station serves for supplying electric energy, by means of which the electric energy store of the motor vehicle can be charged or becomes fully charged. The electric energy store of the motor vehicle serves for temporarily holding electric energy or for operating an electric machine, such as a traction machine, of the motor vehicle. The traction machine serves for propelling the motor vehicle, i.e., for providing a torque used to drive the motor vehicle. For this, the electric machine or traction machine is electrically connected to the electric energy store.

For the providing of the electric energy, the charging station comprises the energy supply device, which is designed and adapted to transmitting electric energy to the motor vehicle for the charging of the energy store. The actual transmitting of the electric energy from the energy supply device to the motor vehicle can basically occur however desired. For example, a cabled transmission can be provided, or alternatively a cable-free transmission. Also a combination of cabled and cable-free transmission can be implemented.

In the case of the cabled transmission, a conductive connection is produced between the energy supply device and the motor vehicle, especially a charging connection of the motor vehicle, for the charging of the energy store. The charging connection, in turn, is connected to the electric energy store. The conductive connection is produced, for example, by means of an electric conductor, such as a cable or the like.

The cable-free connection, on the other hand, may exist by an inductive connection. For this, for example, both the energy supply device and the motor vehicle comprise an electric coil. The electric coil associated with the energy supply device is subjected to an alternating current for the transmittal of electric energy, thereby creating an alternating electromagnetic field. This in turn induces an alternating current in the electric coil associated with the motor vehicle, which is taken to the energy store for the charging process, after a rectifying of the alternating current into the form of direct current.

In order to transmit electric energy by means of the energy supply device to the motor vehicle for the charging of the energy store, it is necessary to park the motor vehicle in the surroundings of the energy supply device. This is especially the case in the event of the cable-free connection, because the motor vehicle needs to be positioned exactly in relation to the electric coil. For this purpose, the charging station comprises the parking area, which is designed and adapted for parking the motor vehicle during the charging of the electric energy store. Preferably, the parking area is formed in the immediate vicinity of the energy supply device, especially connecting directly to the energy supply device.

But because the parking area can also be used for parking by other motor vehicles, which either do not need to be charged by means of the energy supply device or do not even have any energy store which can be charged by means of the energy supply device, it may happen that the motor vehicle having the electric energy store cannot find any space in the vicinity of the energy supply device, so that the energy store cannot be charged by means of the charging station.

This is especially a problem if the motor vehicle has specifically driven to the charging station in order to charge the energy store. For example, the charging station is stored in a database of the motor vehicle and/or is even characterized as available for charging in a central database or control center—because the energy supply device is not being used for the charging of an energy store. Now, if the motor vehicle specifically drives to the charging station on the basis of this availability identification, the energy store cannot be charged, despite this identification.

For this reason, the invention calls for monitoring the availability status of the parking area by means of the device monitoring the surroundings, which operates independently of the energy supply device. The availability status of the parking area indicates whether this is available to receive the motor vehicle or whether it is already occupied by another motor vehicle or is otherwise busy. Accordingly, the availability status can take on two different values, for example, namely "free" and "busy".

The device monitoring the surroundings operates totally independently of the energy supply device. Thus, it does not merely determine whether a motor vehicle is connected at the moment to the energy supply device for the charging of its energy store and has parked at the parking area for this purpose. Instead, the device monitoring the surroundings should be able to ascertain the availability status of the parking area independently of an electric connection between the energy supply device and the other motor vehicle or the providing of electric energy by means of the energy supply device.

For example, an optical detection device is used for this, preferably a camera or the like. The availability status of the parking area is at first monitored or ascertained by means of the device monitoring the surroundings. The ascertained availability status of the parking area is then relayed by the communication connection to the control center. Preferably, this is done continuously, periodically at certain intervals of time, or whenever the availability status changes. Accordingly, the control center is always aware, in any case with a slight time delay, as to whether the charging station is available for the charging of the energy store of the motor vehicle or whether the parking area is occupied.

At the same time as the availability status of the parking area, a charging status can of course be sent by the communication connection to the control center. The charge status describes the condition of the energy supply device, i.e., whether it is being operated at present for the charging of an energy store and is providing electric energy for this or whether it is not being operated to provide electric energy. Accordingly, the charge status can take on the values of "charging" or "not charging", for example.

Because the availability status of the parking area is kept in hand at the control center, the motor vehicle can be brought up specifically to the charging station when this is ready for the charging of the electric energy store, i.e., both the parking area is free and the energy supply device is not being used at present. For this, for example, a further communication connection exists between the control center and the motor vehicle, by which the control center tells the motor vehicle whether and where an available charging station is to be found. Accordingly, the motor vehicle can drive specifically to such an available charging station or be brought up to it. Thanks to the monitoring of the surroundings by means of the device monitoring the surroundings, it can thus be assured that the motor vehicle can use the charging station for the charging of the energy store without waiting time or at least with only slight waiting time.

A further embodiment of the invention calls for using the availability status to determine a follow-up parking time of the motor vehicle at the parking area after a charging of the energy store. The follow-up parking time starts with the end of the charging of the energy store or the electrical separation of the energy store or the motor vehicle from the energy supply device. Usually, however, the motor vehicle does not leave the parking area immediately after the ending of the charging process, but rather does so only after a certain delay. This delay is registered in the form of the follow-up parking time.

The follow-up parking time is ascertained with the help of the availability status or the device monitoring the surroundings. For example, it is possible to determine from the follow-up parking time an average follow-up parking time for multiple motor vehicles, so that a further motor vehicle whose energy store is supposed to be charged will be brought up to the charging station only after this follow-up parking time runs out. Accordingly, thanks to the factoring in of the follow-up parking time in the directing and navigating of the motor vehicle or the further motor vehicle, a better workload of the charging station is accomplished, without waiting times for the motor vehicle or the motor vehicles.

In a further preferred embodiment of the invention, it may be provided that the device monitoring the surroundings is deactivated during the charging of the energy store. While the energy supply device is providing electric energy for the charging of the energy store it may be assumed that the motor vehicle is located at the parking area or remains there. Accordingly, it is not necessary to ascertain the availability status during the charging process. If only for efficiency reasons, it is advisable to deactivate the device monitoring the surroundings during the charging process. Furthermore, such a deactivation may be advisable or even necessary, if only for data protection reasons.

A further preferred embodiment of the invention calls for determining a preliminary parking time of the motor vehicle at the parking area when an availability status corresponding to an occupied parking area without charging of the energy store is present. The preliminary parking time starts with a parking of the motor vehicle at the parking area, i.e., upon change of the availability status from an availability status corresponding to a free parking area to the availability status corresponding to the occupied parking area. The preliminary parking time ends with the start of the charging process. The determining of the preliminary parking time has the advantage that, for example, an average preliminary parking time can be determined for multiple motor vehicles and be used for directing the motor vehicle or the motor vehicles so that the workload of the charging station is improved.

One modification of the invention calls for sending an parking violation notice to the motor vehicle and/or an operator of the motor vehicle and/or the control center if the preliminary parking time surpasses a preliminary parking time threshold value. The preliminary parking time threshold value can basically be chosen at will. For example, it is oriented to the average preliminary parking time. For example, it is chosen to be larger than this time. Once the preliminary parking time passes the preliminary parking time threshold value, the parking violation notice is sent, namely, to at least one, to several, or to all of the following mentioned recipients: the motor vehicle, the operator of the motor vehicle, and the control center.

By sending the parking violation notice to the motor vehicle or its operator, a request to leave the parking area is communicated. Accordingly, it is made clear that the parking area is available for the parking of the motor vehicle only during the charging of the electric energy store by means of the energy supply device, but not for any desired period of time. It may be provided to send the parking violation notice additionally to the control center in order to indicate that the charging station is blocked at the moment by the motor vehicle.

The preliminary parking time threshold value can basically be chosen variously. For example, it is provided that the preliminary parking time threshold value is chosen to be shorter when the control center sends a notification to the charging station that a motor vehicle is driving to the charging station for the charging of the energy store. In this way, the availability of the charging station is enhanced.

A further embodiment of the invention calls for extending the preliminary parking time threshold value by a default value if an identification is sent to the charging station. The default value corresponds, for example, to the above described average value of the preliminary parking time for multiple motor vehicles or it is chosen to be longer than this. It may now be provided that the motor vehicle will be granted a longer stay at the parking area if the identification has been sent to the charging station.

For example, the motor vehicle and/or the operator of the motor vehicle may be identified to the charging station for this purpose. This identification may occur basically in any given manner Especially preferred is a noncontact identification, for example by means of a RFID device or the like. On the other hand, it may be provided, for example, that the preliminary parking time threshold value is shortened, based on the default value, if the charging station is told by the control center that another motor vehicle is driving to the charging station for the charging of its energy store.

A further preferred embodiment of the invention calls for sending a warning to the motor vehicle and/or the operator of the motor vehicle if the follow-up parking time surpasses a first follow-up parking time threshold value, and/or sending the parking violation notice at least to the control center if the follow-up parking time surpasses a second follow-up parking time threshold value. Accordingly, the procedure is a two-stage one in regard to the follow-up parking time. In a first step, the warning is sent only to the motor vehicle or its operator. In a second step, the parking violation notice is sent, namely, at least to the control center. In addition, the parking violation notice may be sent to the motor vehicle or its operator.

Accordingly, in the first step there is only a notification given to the motor vehicle or its operator that the parking area is not available for lengthy parking of the motor vehicle. In the second step, specific actions for the removal of the motor vehicle from the parking area may be taken based on the parking violation notice. The first step is carried out when the follow-up parking time surpasses the first follow-up parking time threshold value and the second step when the follow-up parking time surpasses the second follow-up parking time threshold value. This procedure also improves the availability of the charging station, yet it gives fair warning to the motor vehicle or its operator before taking specific actions for the removal of the motor vehicle from the parking area.

An especially preferred modification of the invention calls for using an optical detection device or a floor-integrated detection device as the device monitoring the surroundings. The optical detection device for example is present in the form of a photocell, a camera, or the like. The floor-integrated detection device may be for example a weight sensor, a magnetic field sensor or the like. For example, a portion of the energy supply device is used as the floor-integrated detection device, especially the coil associated with it. By appropriate actuation, which may be done independently of an energy supplying operation of the energy supply device, the presence of the motor vehicle at the parking area and thus the availability status of the parking area can be inferred.

In another preferred embodiment of the invention it may be provided that an estimated required charging time is determined during the charging process and sent to the control center. The estimated required charging time is ascertained, for example, from a charge state of the energy store and the electric power provided by the energy supply device and/or a time gradient of the charge state. The charging time is communicated to the control center, which can use the charging time for the coordinating of further motor vehicles. In particular, therefore, a further motor vehicle will only be brought up to the charging station by the control center when the estimated required charging time has run out. This procedure also serves to improve the availability of the charging station.

The invention furthermore relates to a charging station for a motor vehicle having an electric energy store, especially to carry out the method according to the embodiments in the context of this specification, comprising an energy supply device for supplying electric energy for charging the energy store and comprising a parking area for parking the motor vehicle during the charging process. It is provided that the charging station is adapted to monitor an availability status of the parking area by means of a device monitoring the surroundings which operates independently of the energy supply device and to transmit this to a control center via a communication connection.

The benefits of such a procedure or such a configuration of the charging station have already been pointed out. Both the charging station and the method for its operation can be modified according to the remarks in the context of this specification, so that reference is made to these remarks in this regard.

BRIEF DESCRIPTION OF THE DRAWING

The disclosure shall be explained more closely in the following with the aid of the exemplary embodiments shown in the drawing, without this being a limitation of the invention. FIG. 1 shows:

FIG. 1 a schematic representation of a charging station having an energy supply device and a parking area for parking a motor vehicle, where a motor vehicle is situated at the parking area.

DETAILED DESCRIPTION

The FIGURE shows an arrangement of a charging station 1 and a motor vehicle 2. The charging station 1 comprises an energy supply device 3, which serves to provide electric energy for the charging of an energy store of the motor vehicle 2, not otherwise represented here. Furthermore, the charging station 1 has a parking area 4 for the parking of the motor vehicle 2 during the charging of the energy store. A condition is shown in which the motor vehicle 2 has been parked at the parking area 4.

The motor vehicle 2 is electrically connected to the energy supply device 3 for the transmission of electric energy to it, namely, preferably in conductive manner by an electrical conductor 5. The conductor 5 is connected electrically on the one hand to the energy supply device 3 and on the other hand to the motor vehicle 2, the latter by a charging terminal 6. The charging terminal 6 is designed for example as a plug terminal. In any case, the conductor 5 is connected to the motor vehicle 2 in releasable, namely, nondestructively releasable manner.

The charging station 1 furthermore comprises a device monitoring the surroundings 7, which serves for determining the availability status of the parking area 4. With the aid of the device monitoring the surroundings 7, it can accordingly be determined whether the parking area 4 is free or occupied, namely, by the motor vehicle 2 or another motor vehicle. The device monitoring the surroundings 7 is present, for example, in the form of an optical detection device, such as a camera. Alternatively, a floor-integrated detection device may also be present, i.e., a device monitoring the surroundings 7 which is integrated in the parking area 4 or situated beneath it.

The availability status of the parking area 4 as determined with the aid of the device monitoring the surroundings 7 is transmitted to a control center 8, shown here only very schematically, namely by a communication connection. Preferably, a further communication connection exists between the control center 8 and the motor vehicle 2. By this further communication connection, the control center 8 can guide the motor vehicle 2 to the charging station 1 once the device monitoring the surroundings 7 has determined that the parking area 4 is available for parking the motor vehicle 2.

By means of the device monitoring the surroundings 7 or the determination of the availability status of the parking area 4, the workload of the charging station 1 can be significantly improved. On the one hand, motor vehicles parked without permission at the parking area 4 can be identified and actions taken to remove them from the parking area 4. On the other hand, a targeted navigating of the motor vehicle 2 to an available charging station, such as the charging station 1, can be done, so that little or no waiting time results for the motor vehicle 2 or the operator of the motor vehicle 2.

The invention claimed is:

1. A method for operating a charging station for a motor vehicle having an electric energy store, comprising:
    monitoring a parking area of the charging station using a monitoring device which operates independently of the charging station,
    determining an availability status of the parking area,
    transmitting the availability status to a control center via a communication connection, and
    providing, by the control center, the availability status to the motor vehicle when requested by the motor vehicle,
    wherein the charging station comprises an energy supply device for supplying electric energy to the electric energy store during a charging process,
    wherein a preliminary parking time, describing a time period before the charging process is started but after the motor vehicle is parked in the parking area, is determined based on the availability status,
    wherein a parking violation notice is sent to the motor vehicle and/or an operator of the motor vehicle when the preliminary parking time exceeds a preliminary parking threshold, and
    wherein the preliminary parking threshold is shortened in response to a notification regarding an incoming motor vehicle which differs from the motor vehicle.

2. The method according to claim 1, wherein a follow-up parking time, describing a time period after the charging process is complete but before the motor vehicle is removed from the parking area, is determined based on the availability status.

3. The method according to claim 2, wherein, when the follow-up parking time exceeds a first follow-up parking threshold, a warning notice is sent to the motor vehicle and/or an operator of the motor vehicle, and wherein, when the follow-up parking time exceeds a second follow-up parking threshold, the parking violation notice is sent to at least the control center.

4. The method according to claim 3, wherein at least one of the first and second follow-up parking thresholds are determined based on an average follow-up parking time as measured across a plurality of motor vehicles by the monitoring device.

5. The method according to claim 3, wherein the second follow-up parking threshold is of a longer duration than the first follow-up parking threshold.

6. The method according to claim 1, wherein the monitoring device is deactivated during the charging process.

7. The method according to claim 1, wherein the preliminary parking threshold value is extended by a predetermined amount when an identification is sent to the charging station.

8. The method according to claim 1, wherein the monitoring device comprises at least one of an optical detection device or a floor-integrated detection device.

9. The method according to claim 1, further comprising estimating, during the charging process, a required charging time and transmitting the required charging time to the control center.

10. The method according to claim 1, wherein the monitoring device comprises at least one of a weight sensor and a magnetic field sensor.

11. The method according to claim 1, wherein the notification regarding the incoming motor vehicle is transmitted from the control center to the charging station.

12. A charging station for a motor vehicle having an electric energy store, the charging station comprising:
    an energy supply device for supplying electric energy to the energy store during a charging process, and
    a parking area for parking the motor vehicle,
    wherein the parking area is monitored by a monitoring device which operates independently of the charging station,
    wherein an availability status of the parking area is determined by the monitoring device and transmitted to a control center via a communication connection,
    wherein the control center is configured to provide the availability status to the motor vehicle when requested by the motor vehicle,
    wherein a preliminary parking time, describing a time period before the charging process is started but after the motor vehicle is parked in the parking area, is determined based on the availability status,
    wherein a parking violation notice is sent to the motor vehicle and/or an operator of the motor vehicle when the preliminary parking time exceeds a preliminary parking threshold, and
    wherein the preliminary parking threshold is shortened in response to a notification regarding an incoming motor vehicle which differs from the motor vehicle.

13. The charging station according to claim 12, wherein the notification regarding the incoming motor vehicle is transmitted from the control center to the charging station.

* * * * *